Dec. 23, 1924.
P. PETERSEN
UTILITY BOX FOR VEHICLES
Filed Dec. 1, 1922
1,520,259
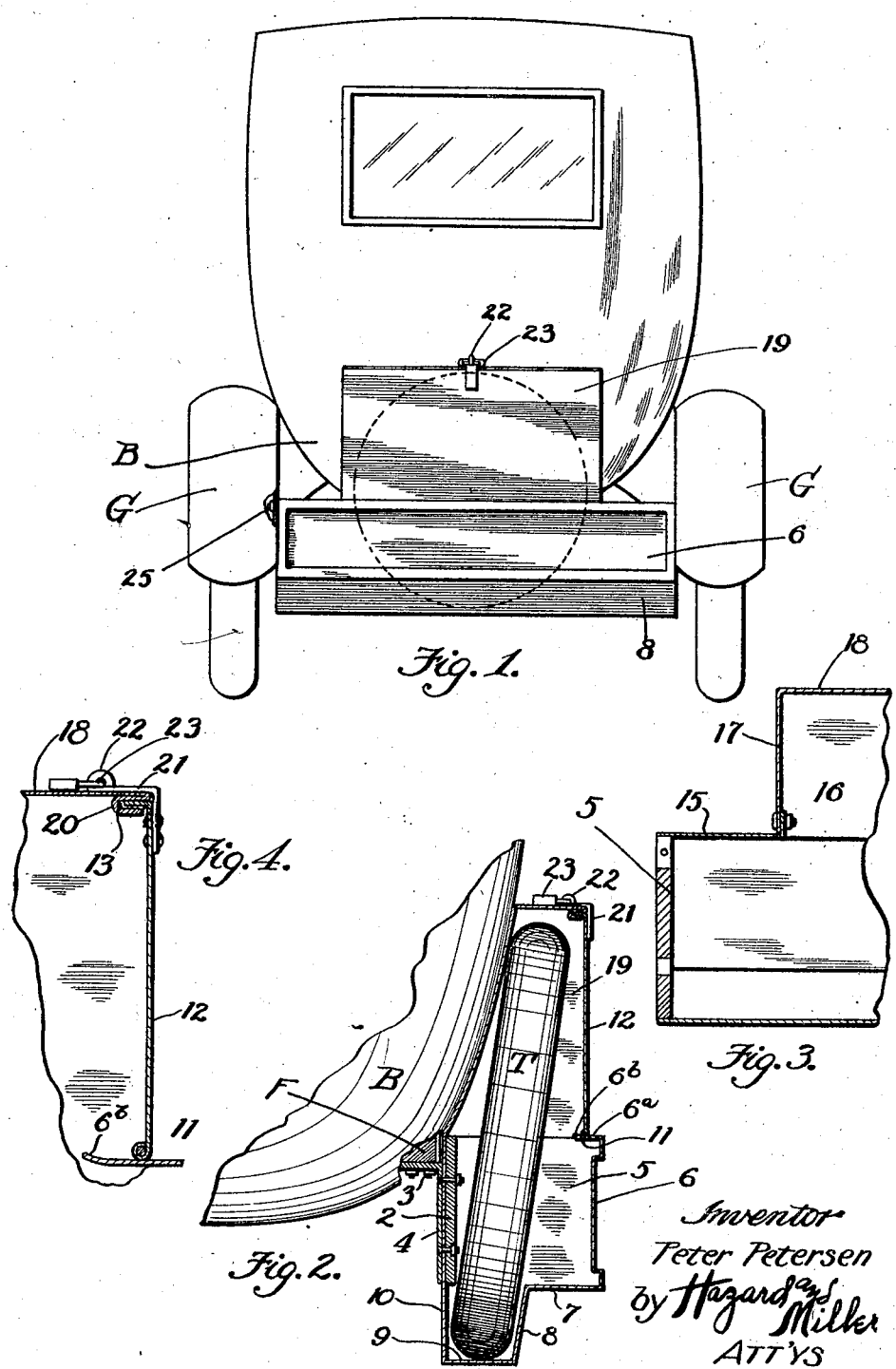

Patented Dec. 23, 1924.

1,520,259

UNITED STATES PATENT OFFICE.

PETER PETERSEN, OF LOS ANGELES, CALIFORNIA.

UTILITY BOX FOR VEHICLES.

Application filed December 1, 1922. Serial No. 604,254.

*To all whom it may concern:*

Be it known that I, PETER PETERSEN, a citizen of the United States, residing at Los Angeles, in the county of Los Angeles and State of California, have invented new and useful Improvements in Utility Boxes for Vehicles, of which the following is a specification.

This invention relates to vehicles, and more particularly to utility boxes for automobile accessories.

It is one of the objects of the present invention to provide an extremely simple, compact, capacious and effective accessory carrier or utility box for vehicles.

Another object is to provide a utility or accessory box that may be readily applied to the rear of the body and chassis structure of automobiles.

Other objects and advantages will be made manifest in the following specification of an embodiment of the invention illustrated in the accompanying drawings, wherein—

Figure 1 is a rear elevation of a closed type of motor vehicle showing the device as applied thereto.

Fig. 2 is a vertical transverse section through the device.

Fig. 3 is a vertical longitudinal section of a portion of the device.

Fig. 4 is a vertical transverse section of a portion of the box.

An object of the invention is to provide a utility or accessory box that can be applied to an automobile without making alterations or changes in the construction of the usual or standard parts of the vehicle, and further to provide for the secure attachment of the box to the vehicle.

The device of the present invention includes a substantial back board 2 adapted to be arranged transversely along the back of the body B which is usually provided with a transverse frame member F, and the box 2 is preferably securely attached to this frame member F as by means of bolts 3 passing through the forwardly extending arms of brackets 4 secured to the back 2. Fastened to the ends and projecting rearwardly from the back 2 are end boards 5, and to the rear edges of these are secured a front box wall or panel 6 which may be of metal, this being continued around and forming a shelf 7 and thence being turned down at 8 and then bent to form a bottom 9 having an upturned wall or flange 10 which is secured to the back board 2. It will be seen that the downwardly extending flanges 8 and 10 with the bottom 9 form a depressed pocket extending longitudinally of the box.

The upper portion of the panel 6 is bent inwardly over the top of the ends 5 as at 6ª and has an upturned lip 6ᵇ. In front of the lip there is hingedly connected at 11 to the flange 6ª a movable lid or cover 12, the upper end of which is clearly shown in Fig. 4 as having an inturned flange 13.

To the end walls 5 of the box and along their upper edges are secured short top plates 15 which extend inwardly a suitable distance and are then upturned as at 16. To the upturned portions of the top pieces 15 is secured upper end panels 17 which in turn are connected to a central top 18. The top and end panels 18 form a compartment of less length than the compartment of the main box between the ends 5; the upper compartment being indicated at 19 and being closed by the upwardly extending lid or cover 12. The length of the upper compartment 19 is designed to be sufficient to permit the insertion of the usual spare tire T of a vehicle wheel, and the height of the box from the top 19 to the bottom 9 of the pocket box is sufficient to permit the ready insertion and removal of the tire.

The outer edge of the top 18 is shown as folded inwardly and returned as at 20 to form a receiver or keeper for the flange 13 of the cover 12, when the latter is in the closing position.

Any suitable means may be employed to secure the cover in its enclosing position, and to that end the cover is provided with a hasp 21 to engage between contiguous eyes 22, which parts are adapted to be locked as by a simple padlock 23.

From this it will be seen that the box provides an ample storage space not only for the proper spare tire for the vehicle, but further provides sufficient room for the storage of tools and extra surplus and cans, such for instance as oil, gas and water containers.

The box is preferably of such length as to extend from one mud guard G to the other at the rear of the vehicle, and in certain cases the end walls 5 of the box are bolted as at 25 to the contiguous inside panels of the mud guards.

The improved utility box is not only substantial in construction and readily attachable to various kinds of vehicles, but furthermore is ornamental when installed, and provides a rear fender protecting the more expensive parts of the vehicle.

Further embodiments, modifications and changes may be resorted to within the spirit of the invention as here claimed.

What is claimed is:

A utility box comprising a substantial back board, end boards secured to the back board, a vertical box wall secured to the end boards, a continuation of the box wall extending horizontally toward the back and forming a shelf and extending downwardly and then horizontally to form a bottom, an upturned wall extending from the bottom and secured to the back board, the back board being adapted to be secured to a transverse frame of a vehicle and the end boards being adapted to be secured to the rear ends of the guards, the upper edge of the vertical box wall being bent horizontally inwardly and having an upturned lip, a movable cover hinged to the horizontal portion and extending upwardly, short top plates secured to the upper edges of the end walls and extending inwardly and having upturned portions at their inner ends, end panels secured to the upturned portions, a central top connecting the end panels, the edge of the top being folded inwardly and returned to form a receiver for the inturned upper edge of the cover, and means for securing the cover in closed position.

In testimony whereof I have signed my name to this specification.

PETER PETERSEN.